(12) United States Patent
Akiyama et al.

(10) Patent No.: US 9,202,284 B2
(45) Date of Patent: Dec. 1, 2015

(54) IMAGE PROCESSING METHOD, IMAGE PROCESSING APPARATUS AND NON-TRANSITORY COMPUTER-READABLE STORAGE MEDIUM THEREFOR

(75) Inventors: Yuji Akiyama, Yokohama (JP); Naoki Sumi, Kawasaki (JP); Manabu Yamazoe, Tokyo (JP); Yoshinori Kawai, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 223 days.

(21) Appl. No.: 13/178,978

(22) Filed: Jul. 8, 2011

(65) Prior Publication Data
US 2012/0014565 A1 Jan. 19, 2012

(30) Foreign Application Priority Data

Jul. 16, 2010 (JP) ................................. 2010-162293

(51) Int. Cl.
| | |
|---|---|
| G06K 9/00 | (2006.01) |
| G06K 9/36 | (2006.01) |
| G06K 9/46 | (2006.01) |
| G06T 7/20 | (2006.01) |
| H04N 19/51 | (2014.01) |

(52) U.S. Cl.
CPC .............. *G06T 7/2033* (2013.01); *G06T 7/2013* (2013.01); *G06T 7/2073* (2013.01); *G06T 2207/10016* (2013.01); *G06T 2207/20164* (2013.01); *H04N 19/51* (2013.01)

(58) Field of Classification Search
CPC .................................................... G06T 7/2033
See application file for complete search history.

(56) References Cited

U.S. PATENT DOCUMENTS

| | | | |
|---|---|---|---|
| 6,456,731 B1 | 9/2002 | Chiba et al. | |
| 6,694,051 B1 | 2/2004 | Yamazoe et al. | |
| 6,788,802 B2 | 9/2004 | Chiba et al. | |

(Continued)

FOREIGN PATENT DOCUMENTS

| | | | |
|---|---|---|---|
| JP | 3435084 B2 | 5/2003 | |
| JP | 2003-224854 A | 8/2003 | |

(Continued)

OTHER PUBLICATIONS

Japanese Official Communication issued Jan. 20, 2015, in counterpart Japanese Patent Application No. 2010-162293.

*Primary Examiner* — Bhavesh Mehta
*Assistant Examiner* — Jonathan S Lee
(74) *Attorney, Agent, or Firm* — Fitzpatrick, Cella, Harper & Scinto

(57) ABSTRACT

An apparatus includes an extraction unit to extract a feature point in a first image. A determination unit determines a motion vector that corresponds to the feature point extracted from the first image by the extraction unit and a corresponding point that is located in a second image and that has a highest degree of similarity between image data for the feature point and image data for the corresponding point, among candidates of the corresponding point in the second image. A correction unit corrects a first motion vector determined by the determination unit by employing a second motion vector determined by the determination unit. The correction unit employs the second motion vector, in accordance with both of a first degree of similarity between the feature point and the corresponding point, and a second degree of similarity between the feature point and another candidate among the candidates.

30 Claims, 14 Drawing Sheets

(56) References Cited

U.S. PATENT DOCUMENTS

| | | |
|---|---|---|
| 7,847,823 B2 | 12/2010 | Habuka et al. |
| 2005/0196107 A1* | 9/2005 | Gu et al. .......................... 385/88 |
| 2005/0265456 A1* | 12/2005 | Scheffler .................. 375/240.16 |
| 2006/0222077 A1* | 10/2006 | Ohwaki et al. ............ 375/240.16 |
| 2007/0222864 A1* | 9/2007 | Hiraga et al. ............. 348/208.4 |
| 2007/0230830 A1* | 10/2007 | Ohwaki et al. ................ 382/300 |
| 2008/0170617 A1* | 7/2008 | Han et al. .................. 375/240.16 |
| 2008/0180535 A1* | 7/2008 | Habuka et al. ............. 348/208.4 |
| 2008/0278633 A1* | 11/2008 | Tsoupko-Sitnikov et al. ............................ 348/699 |
| 2009/0136146 A1* | 5/2009 | Kaino et al. ................. 382/236 |
| 2009/0207260 A1 | 8/2009 | Furukawa |
| 2009/0208102 A1* | 8/2009 | Watanabe ..................... 382/168 |
| 2009/0252374 A1* | 10/2009 | Ishikawa et al. .............. 382/103 |
| 2009/0310876 A1* | 12/2009 | Nishi et al. ................... 382/236 |
| 2010/0034428 A1* | 2/2010 | Fukunishi .................... 382/107 |
| 2010/0097642 A1 | 4/2010 | Sumi |
| 2012/0014453 A1* | 1/2012 | Kawai et al. ............. 375/240.16 |

FOREIGN PATENT DOCUMENTS

| | | |
|---|---|---|
| JP | 2007-122751 A | 5/2007 |
| JP | 3935500 B2 | 6/2007 |
| JP | 2009-188837 A | 8/2009 |

* cited by examiner

| a | b | c |
|---|---|---|
| d | e | f |
| g | h | i |

IMAGE PROCESSING METHOD, IMAGE PROCESSING APPARATUS AND NON-TRANSITORY COMPUTER-READABLE STORAGE MEDIUM THEREFOR

BACKGROUND OF THE INVENTION

1. Field of the Invention

The present invention relates to an image processing method and an image processing apparatus for calculating motion vectors for a plurality of images, and a program that performs the image processing method.

2. Description of the Related Art

A technique for calculating motion vectors for the frames of moving pictures, and aligning the frames based on the motion vectors has been disclosed. Further, a technique for calculating motion vectors at feature points representing the feature of an image, and reflecting the motion vectors onto the individual pixels of the image, has been proposed as a method for calculating motion vectors for the individual pixels that are included in an image. Furthermore, in Japanese Patent No. 3935500, a technique is described whereby color differences, among a plurality of feature points that are included in a single image, or differences of motion vectors that are temporarily obtained for the individual feature points, are regarded as degrees of correlation for the feature points, and motion vector smoothing is performed using the degrees of correlation to obtain motion vectors, for the feature points, that are to be employed to perform the alignment of frames.

According to the technique disclosed in Japanese Patent No. 3935500, the degrees of correlation for a plurality of feature points included in a specific image affect the calculation of motion vectors; however, an area that has feature points similar to those of the specific image is not always included in an image other than the specific image. There is a case wherein the points that correspond to the feature points of a reference image are absent in a comparison image, e.g., before taking a photograph to obtain the comparison image, the camera was moved, and as a result, an object in the reference image disappears in the comparison image; or a case wherein a targeted object is rotated and points corresponding to the feature points of the reference image are hidden in the comparison image. As a result, when frame synthesis is performed for frames for which images differ greatly, feature points will be detected for which motion vectors can not be defined. Therefore, when the technique described in Japanese Patent No. 3935500 is employed to effect a correlation at the feature points for the specific image to the calculation of motion vectors, the precision with which motion estimation is performed may be degraded.

While taking the above problem into account, one objective of the present invention is to provide an image processing method and an image processing apparatus for precisely determining motion vectors for the feature points of an image, and a program therefor.

SUMMARY OF THE INVENTION

To achieve this objective, an image processing apparatus provides: an obtaining unit configured to obtain a plurality of images; a designation unit configured to designate a feature point in a first image of the plurality of images obtained by the obtaining unit; and a determination unit configured to, according to a similarity between image data for the feature point of the first image, designated by the designation unit, and image data for a second image of the plurality of images, determine a motion vector corresponding to the feature point of the first image, based on a position of a corresponding point that is located in the second image and that is correlated with the feature point of the first image, wherein when a corresponding point having a high similarity to the feature point of the first image is not specified in the second image, the determination unit determines a motion vector for the feature point in the first image by employing a motion vector that is determined for a feature point different from the feature point in the first image.

Further features of the present invention will become apparent from the following description of exemplary embodiments (with reference to the attached drawings).

BRIEF DESCRIPTION OF THE DRAWINGS

FIG. 7 is a diagram showing a determination area employed for block matching;

FIG. 14A is an illustrative diagram showing an example reference image;

FIG. 14B is an illustrative diagram showing an example comparison image; and

DESCRIPTION OF THE EMBODIMENT

One embodiment of the present invention will now be described in detail.

Figure 1:
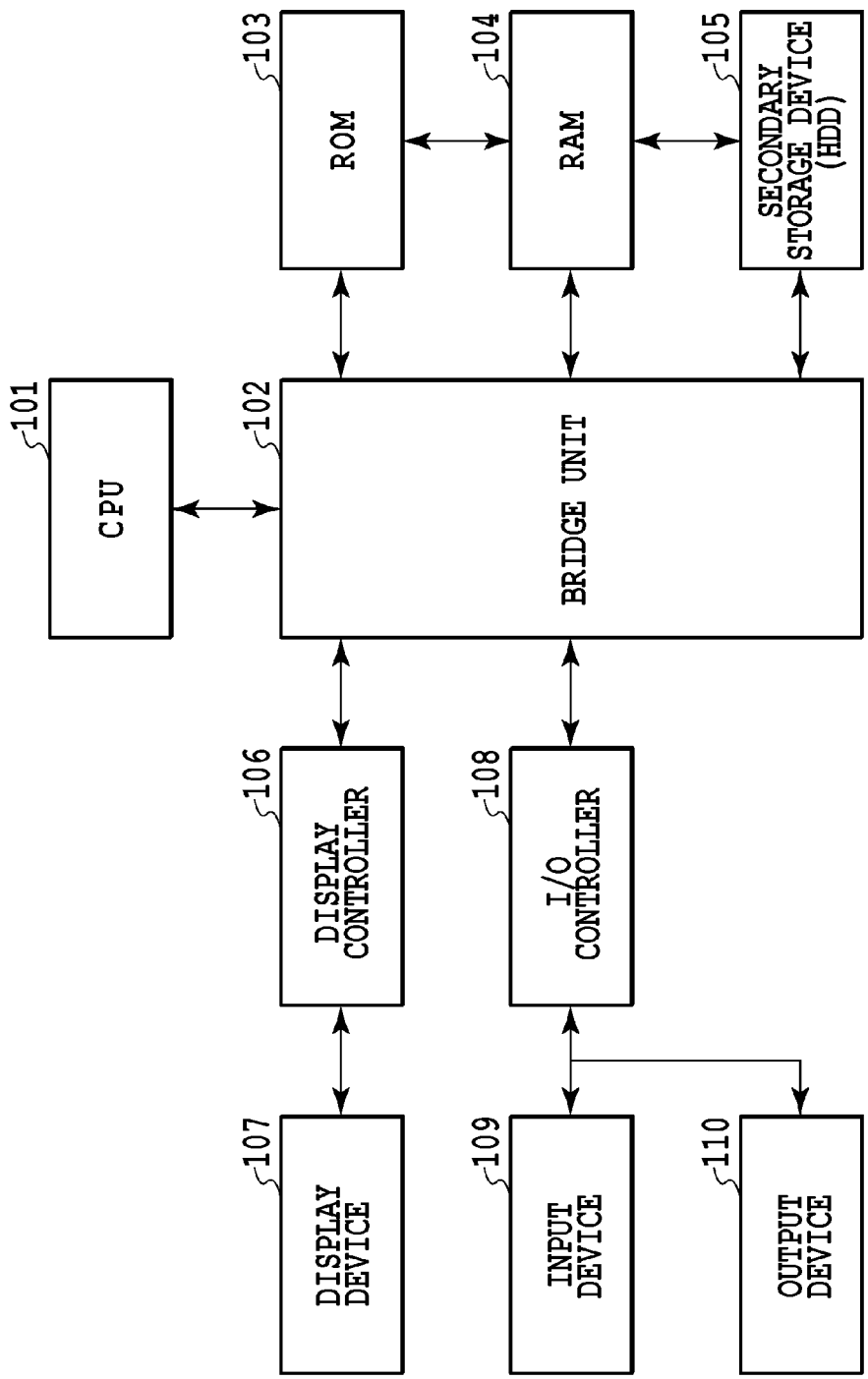
FIG. 1 is a diagram illustrating an example block arrangement for an image processing system.

FIG. 1 is a block diagram illustrating an apparatus employed for image processing. In this description, it is assumed that a PC is employed for an apparatus that performs image processing. A CPU 101 is a central processing unit that controls the other functional blocks and devices. A bridge unit 102 provides a function for the exchange of data by the CPU 101 and the other functional blocks.

A ROM (Read Only Memory) 103 is nonvolatile memory used for reading only, and generally, a program called a BIOS (Basic Input/Output System) is stored in the ROM 103. The BIOS is the first program to be executed when the image processing apparatus is activated, and controls the basic input/output functions of periphery devices, such as a secondary storage device 105, a display device 107, a plurality of input devices 109 and an output device 110. A RAM (Random Access Memory) 104 enables a user to perform fast reading/writing.

The secondary storage device 105 can, for example, be an HDD (Hard Disk Drive) having a large memory capacity; but some other storage device may be employed. When the BIOS is executed, an OS (Operating System) stored on the HDD 105 is executed. The OS performs basic functions that all other applications can utilize, and provides management for all applications and an interface for a basic GUI (Graphical User interface). The applications can employ the GUI function provided by the OS, and themselves provide UIs to perform individual application functions. The OS, application programs and work data are stored either in the RAM 105, or in the secondary storage device 105, depending on the need.

A display controller 106 generates, as GUI image data, the results of an operation that a user performed for the OS or the application, and displays the GUI image data on the display device 107. The display device 107 can, for example, be a liquid display device or a CRT (Cathode Ray Tube) display device; however, another display device may be employed. An I/O controller 108 provides an interface with the input devices 109 and the output device 110. A typical interface can be provided by a USB (Universal Serial Bus) or a PS/2 (Personal System/2).

The input devices 109 include devices, such as a keyboard and a mouse, with which a user's instructions are entered into the image processing apparatus. Further, a device, such as a memory card or a memory stick used for a digital camera, a USB memory, a CF (Compact Flash) memory or a SD (Secure Digital) memory card, that has a memory function, can also be connected as input devices to receive image data. The output device 110 includes a printer for obtaining desired printing results. An image correction application that executes processes indicated in FIG. 3 below is stored in the secondary storage device 105, and is activated in accordance with an operating instruction entered by a user.

Figure 2:
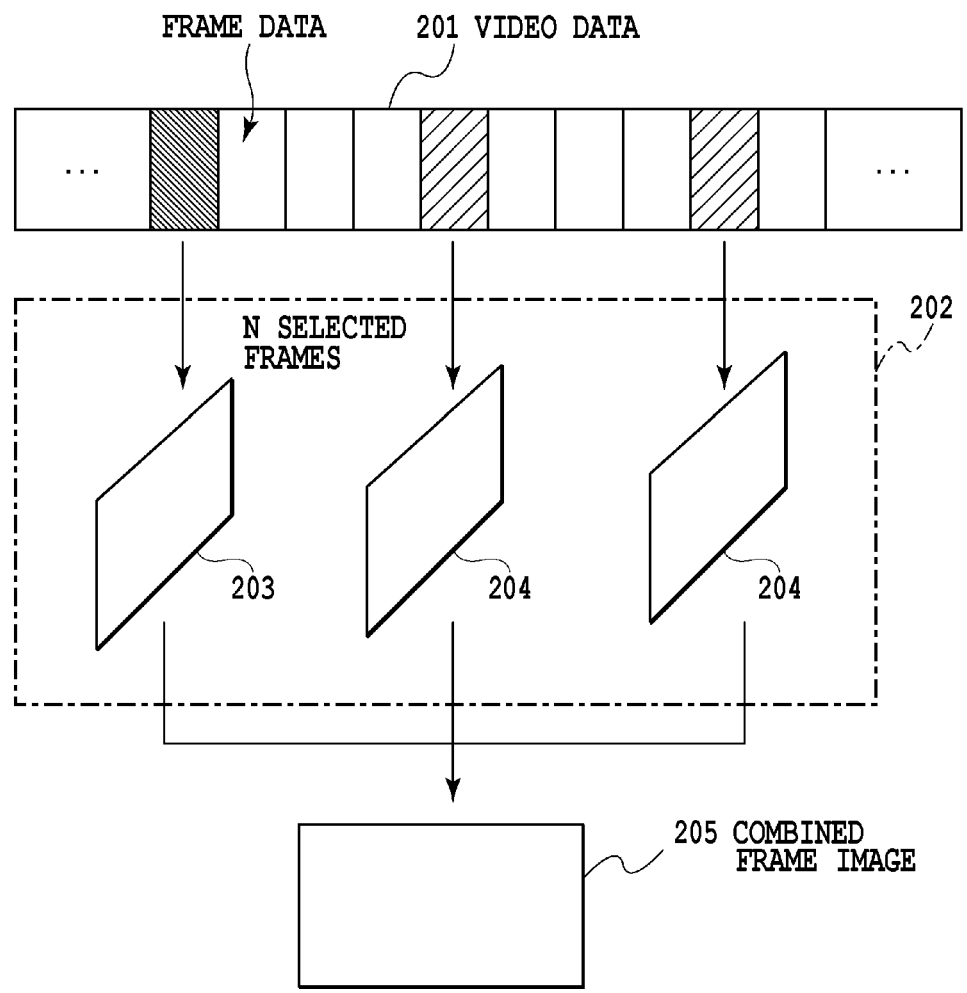
FIG. 2 is a conceptual diagram depicting the concept of a frame-multiplexed image creation method.

FIG. 2 is a conceptual diagram showing an overview of a frame-multiplexed image creation method, according to the present invention, for processing a plurality of frame images. N frames 202 are selected, within a designated range, based on video data 201, and a positional relationship of images is estimated, for these frames, to create a multiplexed image 205. In FIG. 2, three frames (N=3) are selected; however, the number of frames to be selected is not limited to three, and an arbitrary number of frames may be selected, in accordance with the requirements of a system. In this case, a frame 203 designated by a user is specifically called a reference image, and neighboring frames 204 are called comparison images.

Figure 3:
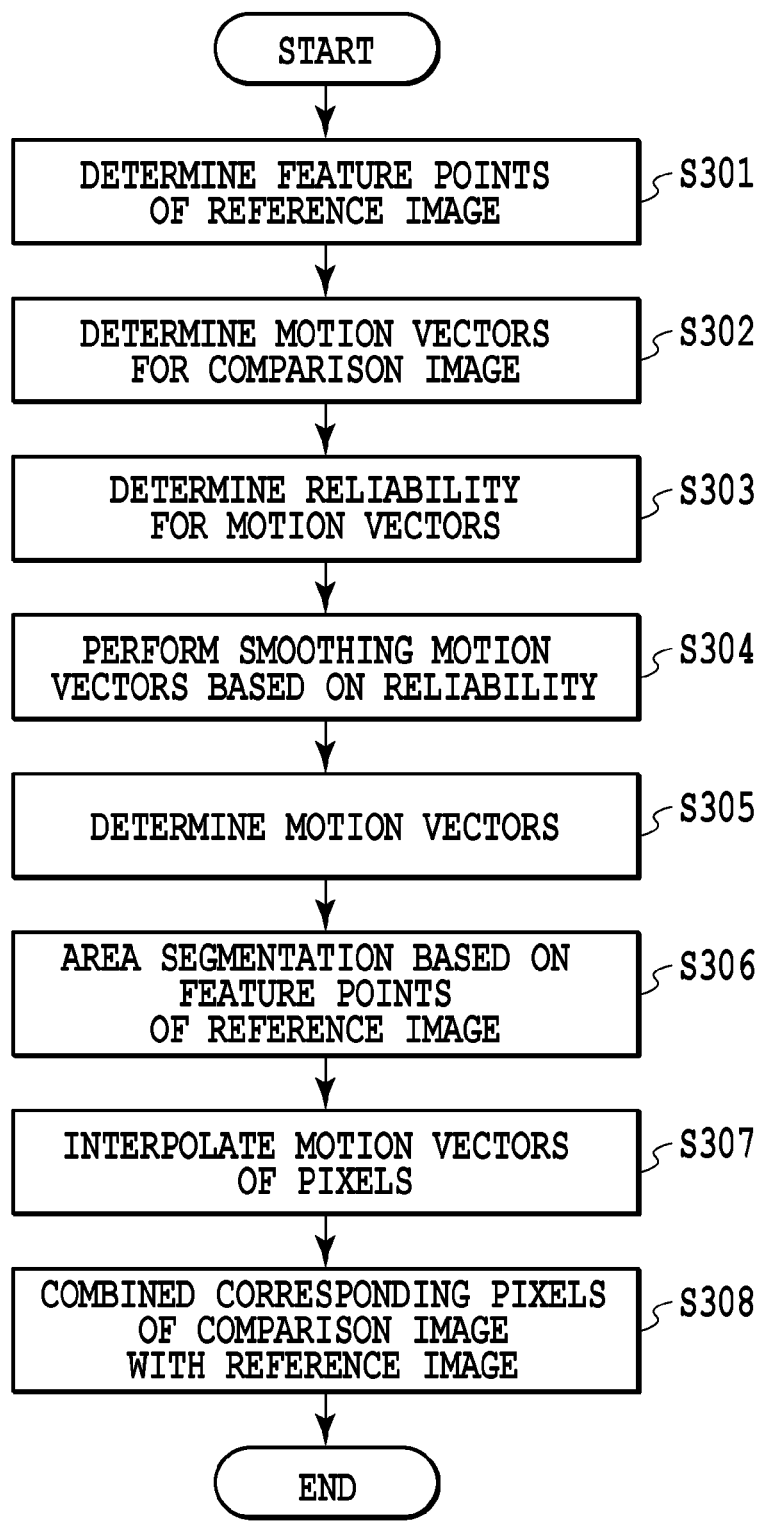
FIG. 3 is an illustrative flowchart for the image processing.

FIG. 3 is a flowchart showing the frame-multiplexed image creation processing performed. The frame-multiplexed image creation processing will now be described in detail by employing the processing steps in the flowchart. In this frame-multiplexed image creation processing, motion vectors are calculated using feature points in a frame, and frames are combined. It should be noted that the processing in the flowchart in FIG. 3 can be provided when the CPU 101 executes a program stored in the ROM 103.

First, feature points are extracted by analyzing the reference image 203 (step S301). Generally, points of an image for which a correlation with comparison images is easily designated are extracted as feature points, and include, for example, points where edges of objects included in the image cross each other, such as points at the corners, like the four corners of the windows in a building, and locally unique points. Concretely, the feature points are obtained in the following manner.

Figure 4:
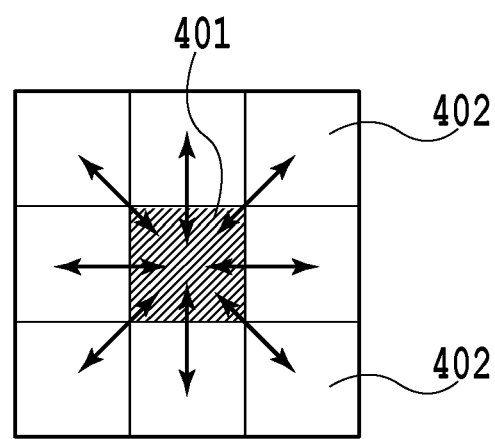
FIG. 4 is a diagram showing an example filter employed for the extraction of feature points.
Figure 5A:
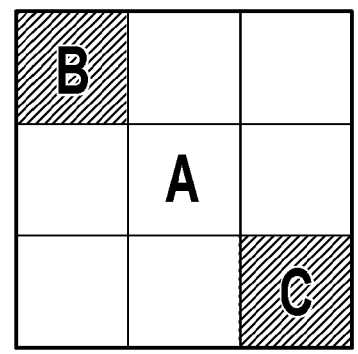
FIGS. 5A to 5D are diagrams showing conditions for pixels to determine whether pixel points are feature points.
Figure 5B:
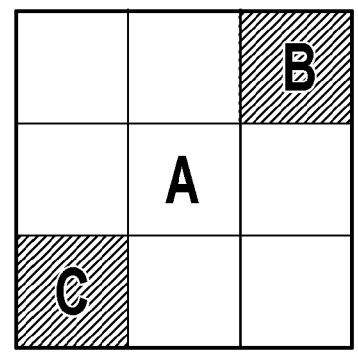
Figure 5C:
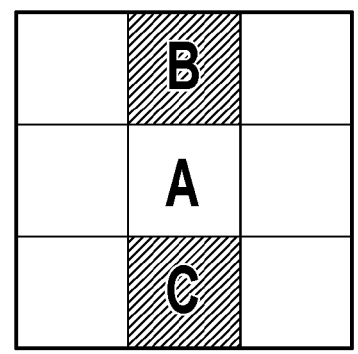
Figure 5D:
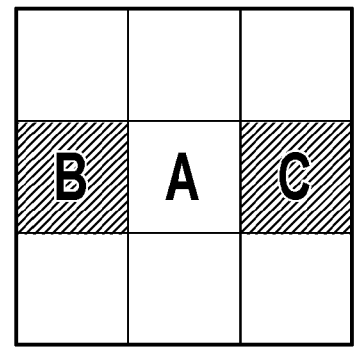

FIG. 4 is a diagram showing a filter, employed for the extraction of feature points, for which the size is 3 pixels by 3 pixels. This filter is employed for individual pixels in the reference image 203 to obtain a color difference between an analysis targeted pixel 401, which is located in the center of the filter, and eight surrounding pixels 402. A color difference can be obtained based on a difference between the values of signals in the RGB or YCC color space, $\Delta E$ in the Lab color space, or the absolute value of a difference in luminance. In this embodiment, RGB signal values are employed to obtain a color difference. When the signal values of the targeted pixel are Rstd (red), Gstd (green) and Bstd (blue), and the signal values of a comparison pixel are Rref (red), Gref (green) and Bref (blue), a color difference between these pixels can be obtained using expression (1):

$$\text{Color difference} = \sqrt{((Rstd-Rref)^2 + (Gstd-Gref)^2 + (Bstd-Bref)^2)} \quad \text{Expression (1)}$$

Here, "^" represents power.

FIGS. 5A to 5D are diagrams showing pixel conditions used to determine whether a portion to be analyzed is a feature point. When color differences between a pixel A of a target to be analyzed and surrounding pixels B and C are equal to or greater than a specified threshold value that is predesignated for all of the four positional relationships in FIGS. 5A to 5D, this portion is determined to be a feature point. Further, when a color difference between either the pixel A and the pixel B, or the pixel A and the pixel C, is equal to or greater than the specified threshold value that is predesignated for the four positional relationships in FIGS. 5A to 5D, this portion is also determined to be a feature point. And when the filter shown in FIG. 4 is employed in this manner, a so-called corner portion, where edges cross each other, can be analyzed and extracted as a feature point.

Figure 6A:
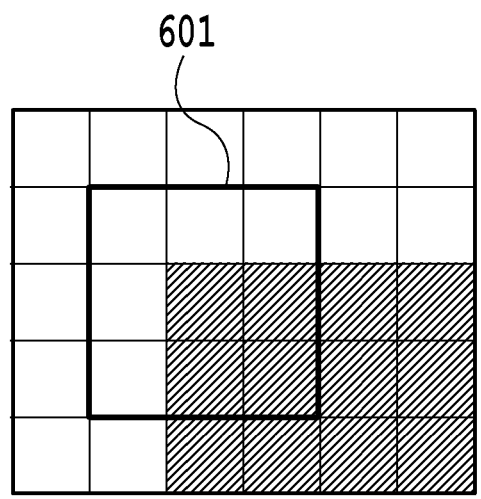
FIGS. 6A to 6C are diagrams showing results obtained by performing a determination of feature points.
Figure 6B:
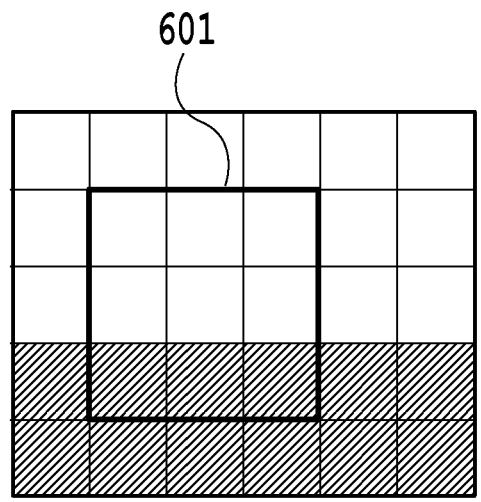
Figure 6C:
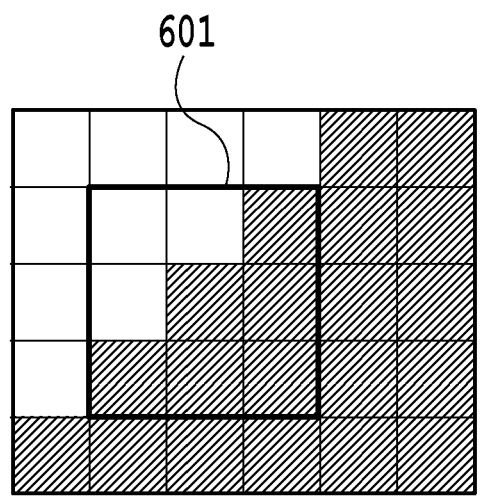

FIGS. 6A to 6C are diagrams showing examples in which the filter shown in FIG. 4 is employed to determine whether an analyzed portion is a feature point. For this determination, an analysis region 601 of the filter is employed. Since the example in FIG. 6A satisfies the condition explained while referring to FIGS. 5A to 5D, this portion is determined to be a corner portion, and is extracted as a feature point. On the contrary, since the examples in FIGS. 6B and 6C do not satisfy the condition explained while referring to FIGS. 5A to 5D, these portions are not extracted as feature points. Following this, corresponding points are specified in the comparison images 204, in correlation with the individual feature points that are extracted in the reference image 203. For identifying the corresponding points, a block matching method, for example, is employed, and image data at the feature points of the reference image 203 are compared with image data for the comparison images, and the portions of the comparison images that are similar to the image data at the feature points are determined to be corresponding points. At this time, differences between the coordinate values of the comparison images and the coordinate value of the reference image are temporarily determined to be motion vectors (S302). For a moving image, the compositional arrangement changes when a camera is moved, and generally, an object to be photographed also moves, so that the points corresponding to the feature points extracted for the reference image are not always present at the same coordinates in the comparison images. Therefore, the corresponding points (or the coordinates thereof) in the comparison images should be identified.

Figure 7:
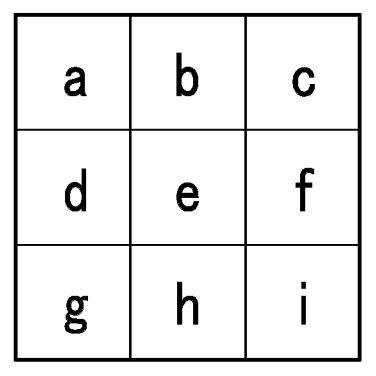

A block matching method will be described as an example method for obtaining corresponding points of comparison images. A determination area employed for block matching is shown in FIG. 7. In FIG. 7, color differences among nine pixels a, b, c, d, e, f, g, h and i are calculated for a reference image and a comparison image. Expression (1) described above can be employed for obtaining the color differences of the individual pixels for the reference image and the comparison image.

The color differences for all the nine pixels a, b, c, d, e, f, g, and i are added, so that a color difference in the block matching determination area, i.e., a similarity can be obtained. When the values of the color differences to be added are smaller, it indicates that the similarity for the block matching determination areas of the reference image and the comparison image is higher.

Figure 8A:
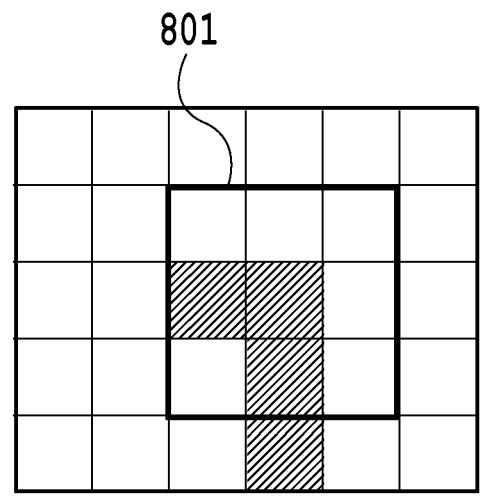
FIG. 8A is a diagram showing a reference image.
Figure 8B:
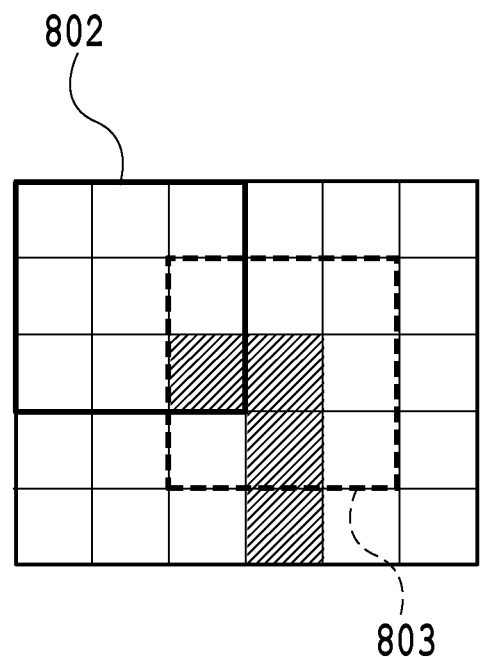
FIG. 8B is a diagram showing a comparison image.

FIGS. 8A and 8B are diagrams showing a reference image and a comparison image, respectively. In FIG. 8A, an area 801 is a block matching area wherein the feature point of the reference image is in the center, and in FIG. 8B, corresponding areas 802 and 803 in the comparison image are specifically selected as block matching determination areas. For these selected areas, color differences from the block matching determination area 801 of the reference image are calculated by employing, as the center, the individual pixels of the selected areas, and an area having the smallest color difference and the highest similarity is determined. The center pixel of the block matching determination area, for which it is determined that the color difference is the smallest and the similarity is the highest, is regarded as a corresponding point that is correlated with the feature point of the reference image. A difference between the feature point of the reference image and the corresponding point obtained by block matching is a motion vector. Since the corresponding point is an estimated point, the reliability of the motion vector can be determined based on the similarity that is associated with the color difference obtained by block matching.

Figure 9A:
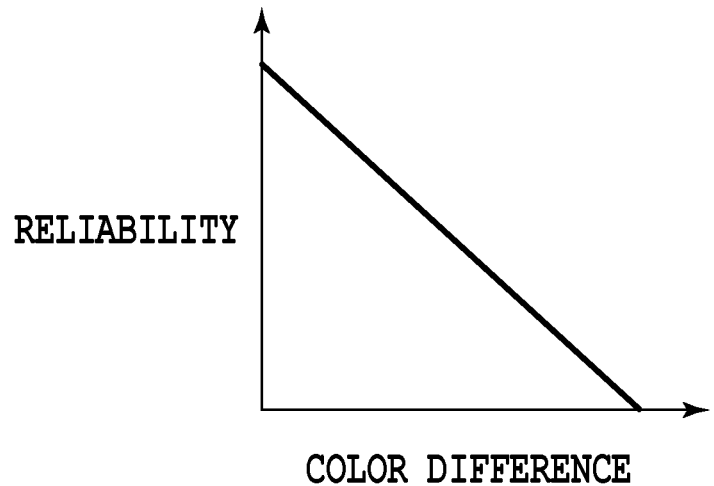
FIGS. 9A to 9C are graphs showing a relationship between a color difference, obtained by block matching, and motion vector reliability.
Figure 9B:
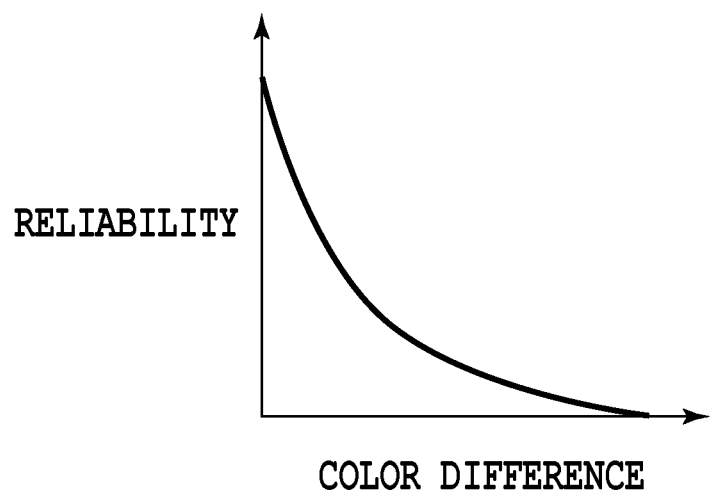
Figure 9C:
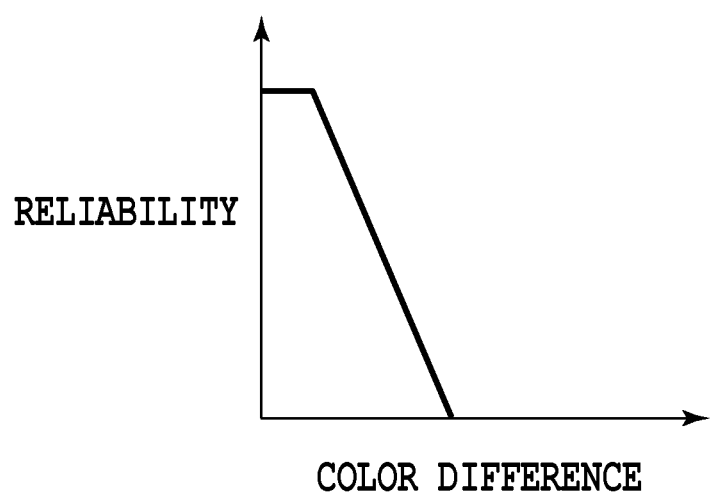

The process (S303), for determining the reliability of motion vectors, will now be described. The relationship between a color difference obtained at block matching and the reliability of motion vectors can be considered as shown in FIGS. 9A to 9C. For example, as shown in FIG. 9A, it may be assumed that a linear relationship has been established between the color difference and the reliability, or as shown in FIG. 9B, a non-linear relationship may be designated, according to which, as the color difference is increased, the reliability is sharply reduced. Further, as shown in FIG. 9C, the reliability may be at the highest level when the color difference is a predetermined threshold value or greater, and may be lowered sharply when the color difference is smaller than the threshold value. After the reliability determination process has been performed, the motion vector smoothing process, which is based on the reliability, is performed (S304).

Figure 10A:
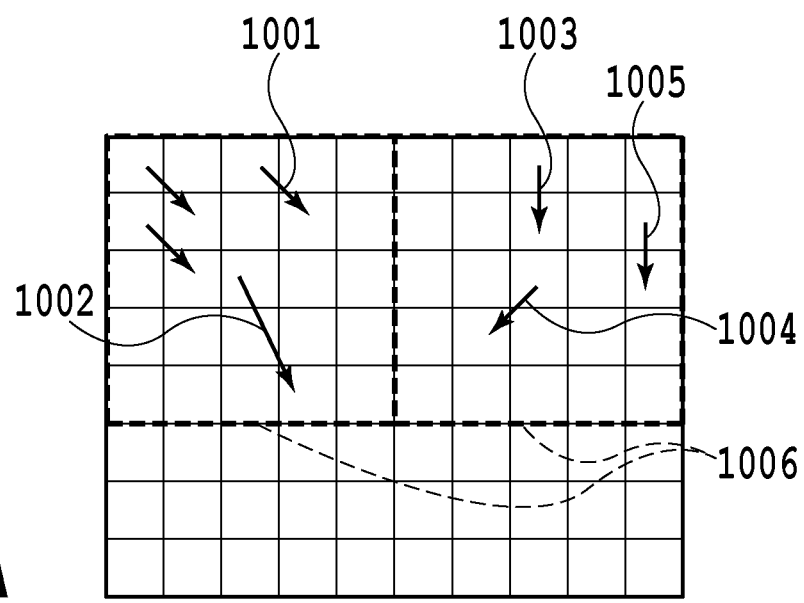
FIGS. 10A and 10B are diagrams showing motion vectors at the individual feature points that are obtained based on feature points in a reference image and corresponding points in a comparison image.
Figure 10B:
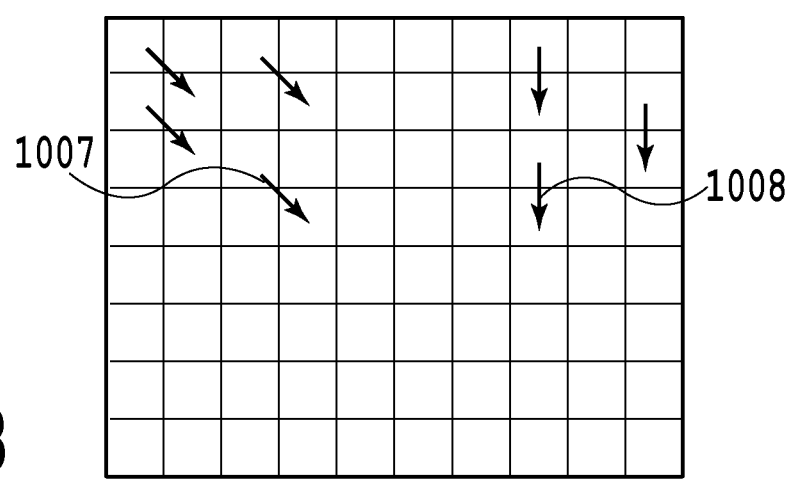

FIGS. 10A and 10B are diagrams showing motion vectors, at the individual feature points of a reference image, that are obtained based on these feature points and the corresponding points of the comparison images. The motion vectors in FIG. 10A are in the state existing before the smoothing process is performed. Referring to FIG. 10A, the directions of motion vectors 1002 and 1004 are different from those of the other, surrounding motion vectors, and the reliability for these vectors is lowered. For the motion vectors for which the reliability is lower than a predesignated reliability level, a weighted average is calculated by employing the motion vectors that are present in a predetermined range 1006 and that have high reliability, so that the motion vectors having low reliability can be smoothed and corrected.

When the motion vectors employed for the smoothing process are V1, V2, V3, . . . and Vn, and the reliability levels for these motion vectors are α1, α2, α3, . . . and αn, expression (2), for calculating a weighted average, can be employed to obtain a motion vector V for which the smoothing process has been performed:

$$V=(\alpha 1 \cdot V1+\alpha 2 \cdot V2+\alpha 3 \cdot V3+\ldots +\alpha n \cdot Vn)/(\alpha 1+\alpha 2+\alpha 3+\ldots +\alpha n)$$ Expression (2).

The smoothing process for the motion vectors need not be performed for all of the motion vectors, and may be performed only for the motion vectors for which the reliability is equal to or lower than a predetermined level.

The motion vectors in FIG. 10B are in the state that follows the performance of the smoothing process. It is apparent from FIG. 10B that the number of motion vectors indicating extremely different directions from those of the surrounding vectors is reduced. That is, through the smoothing process, the motion vectors 1002 and 1004 in FIG. 10A were changed to the motion vectors 1007 and 1008 in FIG. 10B.

As a result of the vector smoothing process, the final motion vector can be determined (S305). Since this process is performed, the directions and the sizes of the motion vectors are averaged in a predetermined area of an image, and as a result, the motion vectors can be precisely determined.

Following this, the segmentation of the image area is performed in accordance with the feature points of the reference image. At this time, since the feature points appear at arbitrary locations, the area is divided into a plurality of triangles (S306). This segmentation can be performed, for example, by the Delaunay triangulation. In this embodiment, the image area is divided into triangular segments; however, the image area may be divided into other polygonal segments, such as quadrilateral segments.

In order to process all of the image segments, the four corner points of the image can be added as feature points (if they have not yet been extracted as feature points). Motion vectors that are corresponding to the additional feature points may be designated based on the correlation with the comparison image; however, since originally these points have not been extracted as feature points, and the correlation can not easily be identified, a motion vector for at least one of the feature points in the neighbor that were already extracted may be employed to designate the motion vectors for the additional feature points.

Figure 12:
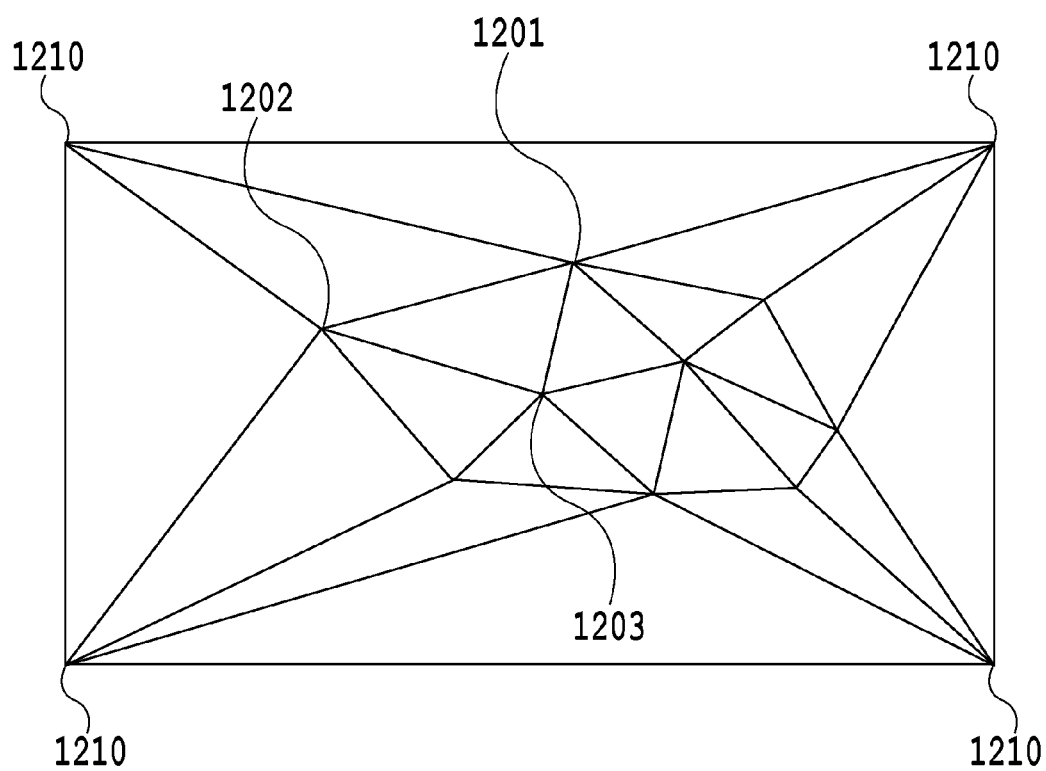
FIG. 12 is a diagram showing an example for area segmentation of the reference image that includes the extracted feature points and additional feature points.
Figure 13:
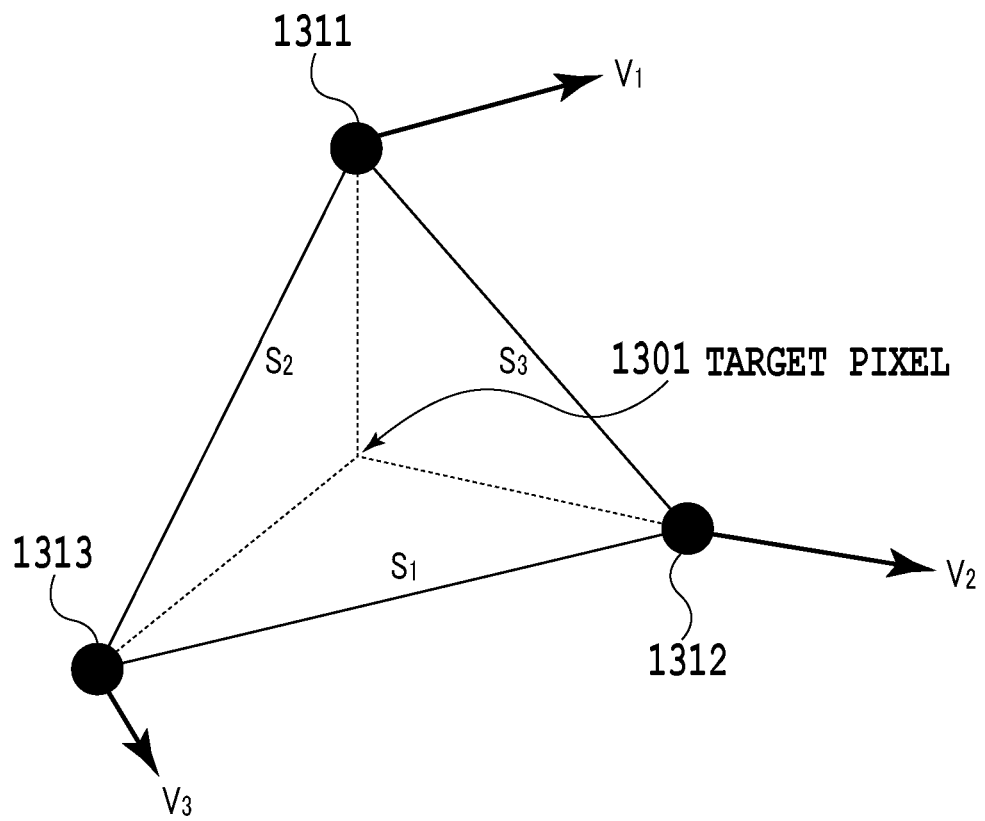
FIG. 13 is a diagram showing a method for performing area oriented interpolation for a triangle to calculate a motion vector for a target pixel.

FIG. 12 is a diagram showing example area segmentation for a reference image that includes extracted feature points and additional feature points. Vertexes 1201 to 1203 of the individual triangles indicate feature points. It is apparent from what is shown in FIG. 12 that since four corners 1210 of an image are added as feature points, all of the pixels that form the image belong to arbitrary triangular areas. Further, the obtained triangular segments are employed to determine pixels of comparison images that are correlated with the pixels of the reference image. FIG. 13 is a diagram illustrating a method for performing area oriented interpolation of triangles to calculate a motion vector for a target pixel. Vertexes 1311 to 1313 of a triangle that a target pixel 1301 belongs to are feature points, and motion vectors are set for these vertexes.

Therefore, a motion vector V for the target pixel 1301 can be obtained by calculating a weighted average of motion vectors $V_1$, $V_2$ and $V_3$ for the three feature points 1311 to 1313 based on three segments $S_1$, $S_2$ and $S_3$ that form a triangle (S307). Specifically, each of the motion vector elements is multiplied by, as a weight, the segment of the triangle on the side where the pertinent motion vector is not included as a feature point, and the obtained result is divided by the total dimension of the triangle. That is, the motion vector V is obtained by the following expression (3):

$$V=(S_1V_1+S_2V_2+S_3V_3)/(S_1+S_2+S_3)$$ Expression (3).

At the end of the processing, the value of the pixel of the comparison image, which has been moved a distance equivalent to the motion vector that was calculated by interpolation, is added to the coordinates of the target pixel 1301 of the reference image (step S308) to combine the comparison image with the reference image. When the reference image and the comparison image are aligned and combined in this manner, a reduction in noise can be expected, for example, for frames of moving pictures that were photographed in a dark setting.

As described above, the reliability of motion vectors for the feature points included in a reference image is calculated, and in accordance with the reliability, the motion vectors of the feature points are determined by employing the surrounding motion vectors. Therefore, when the feature points of the reference image are not included in a comparison image, motion vectors can be precisely determined.

In a case wherein the reliability calculated for the motion vectors at feature points is lower than a predetermined reliability level (e.g., the obtained reliability is zero), the motion vectors of the feature points may be determined based on only the surrounding motion vectors, instead of by employing motion vectors that are temporarily determined for the feature points.

Furthermore, the example has been given, while referring to FIG. 3, wherein temporary motion vectors are determined based on feature points extracted from a reference image and corresponding points in a comparison image, and are corrected by employing the other motion vectors in accordance with the similarity of the corresponding points to the feature points. However, the present invention is not limited to this example. When points corresponding to the feature points are searched for in a comparison image, and the similarity of the obtained corresponding points to the feature points is low, motion vectors for the feature points need not be determined at this time. In this case, motion vectors for the feature points that have high similarity may be obtained, and may, thereafter, be employed to determine feature points that have low similarity.

For example, assume that, as the result of block matching between a reference image and a comparison image, only a color difference of a predetermined value or greater is obtained for feature points. In this case, it is assumed that the similarity level for the comparison image to the feature points is a predetermined value or smaller, and it is determined that there are no points in the comparison image that correspond to the feature points. Thereafter, the motion vectors for the feature points, for which the corresponding points can be identified with a color difference having a smaller predetermined value, are employed to determine the motion vectors of the feature points, for which only a color difference of the predetermined value or greater is obtained.

Figure 11A:
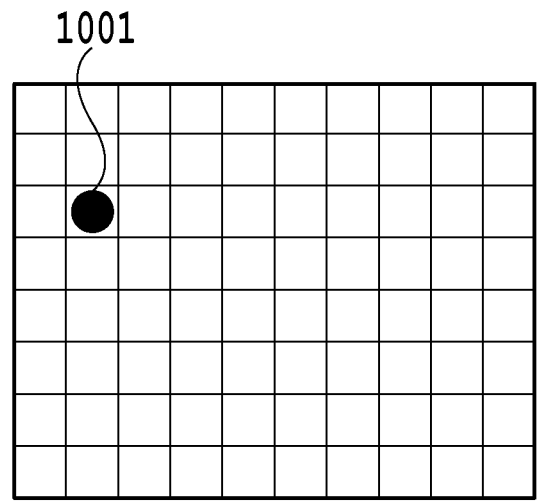
FIGS. 11A to 11C are diagrams respectively showing the feature point of a reference image, the corresponding points of a comparison image and a motion vector.
Figure 11B:
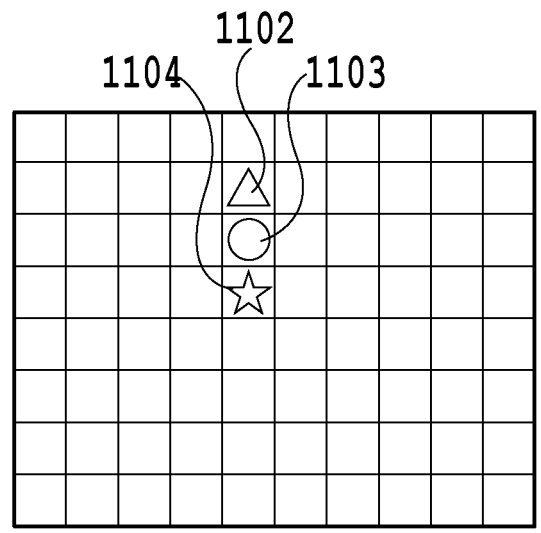
Figure 11C:
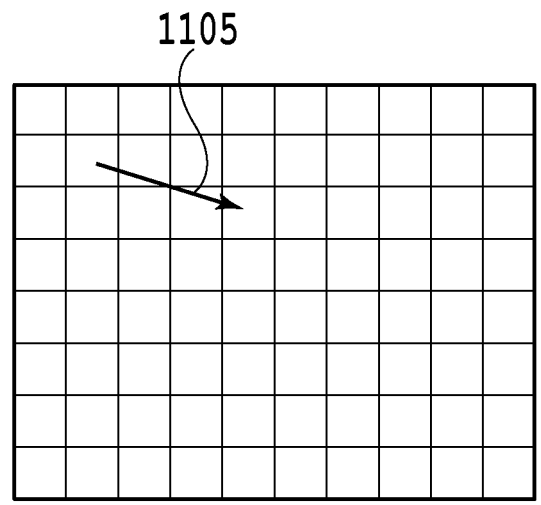

An explanation will be given for an example wherein a plurality of corresponding points are extracted in a comparison image for one feature point in a reference image. Hereinafter, mainly the process (S302) for determining a temporary motion vector for a comparison image when a plurality of corresponding points are extracted, and the process (S303) for determining the reliability of a motion vector will be described. FIGS. 11A to 11C are diagrams showing a feature point for a reference image, corresponding points for a comparison image and a motion vector.

In the examples in FIGS. 11A to 11C, three corresponding points 1102, 1103 and 1104 are obtained in the comparison image, in correlation with a feature point 1101 for the reference image. In this example, the similarity is equal, or substantially equal based on a color difference obtained by block matching performed for the corresponding points 1102, 1103 and 1104.

In this case, one of the corresponding points, a pixel located in the center of a plurality of the corresponding points, or the pixel point for which the color difference obtained by block matching is the smallest, is regarded as a corresponding point. Further, a difference between the feature point of the reference image and the corresponding point of the comparison image is determined to be a temporary motion vector. However, when a plurality of corresponding point choices are present at the adjacent positions, it indicates that the similarity of the corresponding point that is identified is low, and accordingly, the reliability level for the motion vectors is set to low. Specifically, when there are n corresponding point choices, the reliability for motion vectors is set to 1/n. Or, it may be determined that similarity for the corresponding point is extremely low, and the reliability for the motion vector may be set to zero.

Through the above described processing, it is determined that the point 1103 shown in FIG. 11B corresponds to the feature point 1101 in FIG. 11A, and a motion vector 1105 shown in FIG. 11C can be obtained.

As described above, when one corresponding point is identified in the above described manner, and the motion vector and the reliability thereof are determined to perform the above described frame synthesis processing, a case can be handled wherein a plurality of corresponding points are found.

Next, an explanation will be given for the processing performed to provide additional feature points for four corners of an image in order to precisely perform an interpolation for an entire image area. Further, additional feature points are provided in order to increase the interpolation accuracy using the Delaunay triangulation, and for these additional feature points, temporary motion vectors and the reliability of the motion vectors are determined. Further, a temporary motion vector determination method and a motion vector reliability determination method will be described, specifically for a case wherein feature points obtained in the feature point extraction process are present around an image.

Figure 14C:
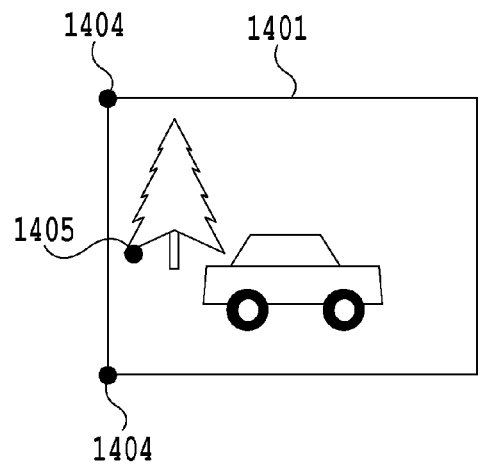
FIG. 14C is an illustrative diagram showing a comparison image with a missing portion of the reference image.
Figure 14C:
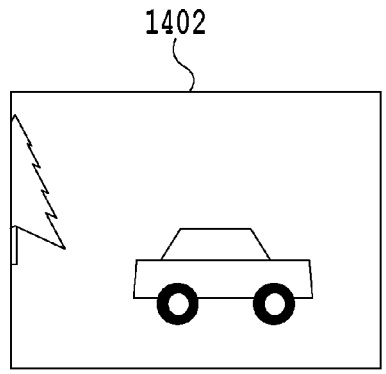
Figure 14C:
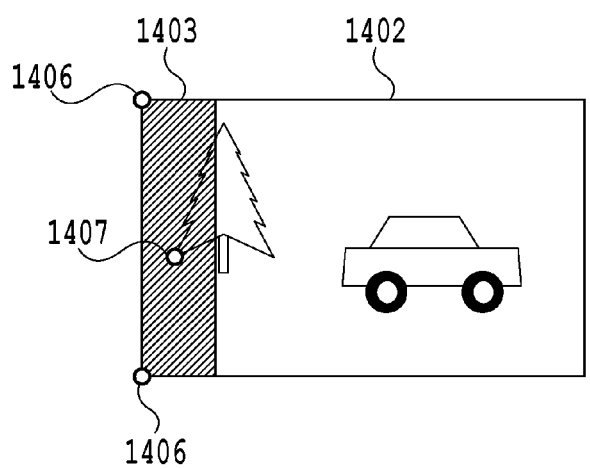

FIGS. 14A to 14C are diagrams showing a reference image and a comparison image. The position of an object in comparison image 1402 in FIG. 14B differs from that in reference image 1401 in FIG. 14A, because before the photograph in 14B was taken either a camera or the object was moved a considerable distance. Particularly for the pixels near the four corners of the reference image 1401, corresponding points in the comparison image 1402 are often not present because either a camera or an object has been moved. Feature points 1404 are added to the reference image 1401, so that even in such a case an appropriate motion vector can be obtained. It should be noted that a feature point 1405 is a point originally obtained during the feature extraction process.

In FIG. 14C, a missing area 1403 is an area that is present in the reference image 1401 but that is omitted in the comparison image 1402 because the camera was moved. The points that correspond to the feature points 1404 and 1405 are corresponding points 1406 and 1407, which are included in the missing area 1403. That is, points that correspond to the feature points are not present in the comparison image. While taking these circumstances into account, since the feature points 1404 that are additionally provided were not originally extracted as feature points, reliability should be set low. That is, reliability is calculated in the above described manner, using the similarity, which is based on a color difference, that is obtained when block matching is performed to search for corresponding points in the comparison image; however, as for the corresponding points for the additionally provided feature points, a lower reliability than the obtained reliability is set for motion vectors. In this instance, it is more preferable that the reliability be set to zero for the motion vectors of the additionally provided feature points. When an additionally provided feature point is employed to obtain a motion vector, it is rather difficult to establish a correlation with a corresponding point in a comparison image. Therefore, a motion vector that is obtained based on at least one of the neighboring feature points can be employed.

Furthermore, a probability that for feature points extracted using the above described method, corresponding points will be missed in the comparison image may be considered, and low reliability may be set for the motion vectors that are obtained based on the feature points in the peripheral area of these feature points. For example, when the reliability for the motion vectors is calculated using the similarity that is obtained based on a color difference calculated by block matching, for the reliability, either one half or zero is set.

When low reliability is set for the motion vectors, erroneous determinations made for image alignment using the feature points can be prevented.

(Other Embodiments)

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-162293, filed Jul. 16, 2010, which is hereby incorporated by reference herein in its entirety.

What is claimed is:

1. An apparatus comprising:
    an extraction unit configured to extract an edge feature point corresponding to an edge in a first image, from the first image;
    a first determination unit configured to determine temporally a temporal motion vector that corresponds to the edge feature point extracted from the first image by the extraction unit and a corresponding point that is located in a second image and that has a highest degree of similarity between image data for the edge feature point and image data for the corresponding point among candidates of the corresponding point in the second image;
    a setting unit configured to set a feature point, on a corner of the first image, regardless of whether the set feature point corresponds to an edge in the first image or not;
    a second determination unit configured to determine a motion vector corresponding to the edge feature point, by using a first temporal motion vector determined for the edge feature point by the first determination unit and a second temporal motion vector determined by the first determination unit, in accordance with the highest degree of similarity and to determine a motion vector corresponding to the set feature point set on the corner by the setting unit, using a temporal motion vector corresponding to a neighboring edge feature point and without using a temporal motion vector corresponding to the set feature point; and
    at least one processor configured to function as at least one of the extraction unit, the first determination unit, the setting unit, and the second determination unit.

2. The apparatus according to claim 1, further comprising a reliability determination unit configured to determine motion vector reliability for the first temporal motion vector and the second temporal motion vector determined by the first determination unit in accordance with the highest degree of the similarity for each of the first temporal motion vector and the second temporal motion vector,
    wherein the second determination unit uses the first temporal motion vector and the second temporal motion vector in accordance with a degree of employing, corresponding to the reliability determined for the first temporal motion vector and the second temporal motion vector by the reliability determination unit.

3. The apparatus according to claim 2, wherein the reliability determination unit sets the reliability for the temporal motion vector, determined by the first determination unit for the set feature point to zero.

4. The apparatus according to claim 1, wherein the second determination unit uses the first temporal motion vector and the second temporal motion vector, in accordance with both of the highest degree of the similarity and a number of candidates of the corresponding point that have second degrees that are substantially equal to the highest degree.

5. The apparatus according to claim 1, wherein the second determination unit uses the second temporal motion vector in accordance with a position of the edge feature point corresponding to the first temporal motion vector in the image data.

6. The apparatus according to claim 1, wherein, in a case when the highest degree of the similarity corresponding to the first temporal motion vector is equal to or less than a predetermined value, the second determination unit uses, not the first temporal motion vector, but the second temporal motion vector, for the edge feature point corresponding to the first temporal motion vector.

7. The apparatus according to claim 1, further comprising a combining unit configured to combine the first image and the second image by aligning the first image and the second image using the first motion vector that is determined for the edge feature point by the second determination unit.

8. A method comprising:
    an extracting step of extracting an edge feature point corresponding to an edge in a first image, from a first image;
    a first determination step of determining temporally a temporal motion vector that corresponds to the edge feature point extracted from the first image in the extraction step and a corresponding point that is located in a second image and that has a highest degree of a similarity between image data for the edge feature point and image data for the corresponding point among candidates of the corresponding point in the image;

a setting step of setting a feature point, on a corner of the first image, regardless of whether the set feature point corresponds to an edge in the first image or not; and a second determination step of determining a motion vector corresponding to the edge feature point, by using a first temporal motion vector determined in the determination step for the edge feature point by the first determination unit and a second temporal motion vector determined in the first determination step, in accordance with the highest degree of similarity and to determine a motion vector corresponding to the set feature point set on the corner by the setting unit, using a temporal motion vector corresponding to a neighboring edge feature point and without using a temporal motion vector corresponding to the set feature point.

9. A non-transitory computer-readable storage medium, in which a program is stored that permits a computer to perform a method comprising:

an extracting step of extracting an edge feature point corresponding to an edge in a first image, from a first image;

a first determination step of determining temporally a temporal motion vector that corresponds to the edge feature point extracted from the first image in the extraction step and a corresponding point that is located in a second image and that has a highest degree of a similarity between image data for the edge feature point and image data for the corresponding point among candidates of the corresponding point in the image;

a setting step of setting a feature point, on a corner of the first image, regardless of whether the set feature point corresponds to an edge in the first image or not and a second determination step of determining a motion vector corresponding to the edge feature point, by using a first temporal motion vector determined in the determination step for the edge feature point by the first determination unit and a second temporal motion vector determined in the first determination step, in accordance with the highest degree of similarity and to determine a motion vector corresponding to the set feature point set on the corner by the setting unit, using a temporal motion vector corresponding to a neighboring edge feature point and without using a temporal motion vector corresponding to the set feature point.

10. The apparatus according to claim 1, wherein the first image and the second image are included in a moving image.

11. The apparatus according to claim 1, wherein a degree to which the second determination unit uses the second temporal motion vector is higher, in a case when the highest degree of the similarity is a second value that is less than a first value, than in a case when the highest degree of the similarity is the first value.

12. The method according to claim 8, further comprising a reliability determination step of determining motion vector reliability for the first temporal motion vector and the second temporal motion vector determined in the first determination step in accordance with the highest degree of the similarity for each of the first temporal motion vector and the second temporal motion vector, wherein the second determination step uses the first temporal motion vector and the second temporal motion vector in accordance with a degree of employing, corresponding to the reliability determined for the first temporal motion vector and the second temporal motion vector by the reliability determination step.

13. The method according to claim 12, wherein, in the reliability determination step, the reliability for the temporal motion vector, determined in the first determination step for the set feature point is zero.

14. The method according to claim 8, wherein the second determination step uses the first temporal motion vector and the second temporal motion vector, in accordance with the highest degree of employing, corresponding to the reliability determined for the second temporal motion vector by the reliability determination step.

15. The method according to claim 8, wherein the second determination step uses the second temporal motion vector in accordance with a position of the edge feature point corresponding to the first temporal motion vector in the image data.

16. The method according to claim 8, wherein, in a case when the highest degree of the similarity corresponding to the first temporal motion vector is equal to or less than a predetermined value, the correction step employs, not the first temporal motion vector, but the second temporal motion vector, for the edge feature point corresponding to the first temporal motion vector.

17. The method according to claim 8, further comprising a combining step of combining the first image and the second image by aligning the first image and the second image using the first motion vector that is determined in the second determination step for the edge feature point.

18. The method according to claim 8, wherein the plurality of images is included in a moving image.

19. The method according to claim 8, wherein the degree to which the second determination unit uses the second temporal motion vector is higher, in a case when the highest degree of the similarity is a second value that is less than a first value, than in a case when the highest degree of the similarity is the first value.

20. The apparatus according to claim 4, wherein the second determination unit uses the second temporal motion vector, so that an employing degree of the second temporal motion vector, when the number is a first number, is higher than that when the number is a second number that is less than the first number.

21. The method according to claim 8, wherein the second determination step uses the second temporal motion vector, so that an employing degree of the second temporal motion vector, when the number is a first number, is higher than that when the number is a second number that is less than the first number.

22. The medium according to claim 9, further comprising a reliability determination step of determining motion vector reliability for the first temporal motion vector and the second temporal motion vector determined in the first determination step in accordance with the highest degree of the similarity for each of the first temporal motion vector and the second temporal motion vector, wherein the second determination step uses the first temporal motion vector and the second temporal motion vector in accordance with a degree of employing, corresponding to the reliability determined for the first temporal motion vector and the second temporal motion vector by the reliability determination step.

23. The medium according to claim 22, wherein, in the reliability determination step, the reliability for the temporal motion vector, determined in the first determination step for the set feature point is zero.

24. The medium according to claim 9, wherein the second determination step uses the first temporal motion vector and the second temporal motion vector, in accordance with the highest degree of employing, corresponding to the reliability determined for the second temporal motion vector by the reliability determination step.

25. The medium according to claim 9, wherein the second determination step uses the second temporal motion vector in accordance with a position of the edge feature point corresponding to the first temporal motion vector in the image data.

26. The medium according to claim 9, wherein, in a case when the highest degree of the similarity corresponding to the first temporal motion vector is equal to or less than a predetermined value, the correction step employs, not the first temporal motion vector, but the second temporal motion vector, for the edge feature point corresponding to the first temporal motion vector.

27. The medium according to claim 9, further comprising a combining step of combining the first image and the second image by aligning the first image and the second image using the first motion vector that is determined in the second determination step for the edge feature point.

28. The medium according to claim 9, wherein the plurality of images is included in a moving image.

29. The medium according to claim 9, wherein the degree to which the second determination unit uses the second temporal motion vector is higher, in a case when the highest degree of the similarity is a second value that is less than a first value, than in a case when the highest degree of the similarity is the first value.

30. The medium according to claim 9, wherein the second determination step uses the second temporal motion vector, so that an employing degree of the second temporal motion vector, when the number is a first number, is higher than that when the number is a second number that is less than the first number.

* * * * *